United States Patent [19]

Yasui et al.

[11] Patent Number: 4,997,911

[45] Date of Patent: Mar. 5, 1991

[54] METHOD OF RECOVERING POLYMER AGGLOMERATES AS DRY POWDERS OR GRANULES

[75] Inventors: Hideo Yasui, Houston, Tex.; Wataru Okada, Kobe, Japan; Yasuhiro Miki, Brussels, Belgium; Toragoro Mitani, Takasago, Japan

[73] Assignee: Kanegafuchi Kagaku Kogyo Kabushiki Kaisha, Osaka, Japan

[21] Appl. No.: 241,178

[22] Filed: Sep. 7, 1988

Related U.S. Application Data

[63] Continuation-in-part of Ser. No. 137,312, Dec. 23, 1987, abandoned.

[30] Foreign Application Priority Data

Dec. 27, 1986 [JP] Japan .............................. 61-312581
Dec. 27, 1986 [JP] Japan .............................. 61-312582

[51] Int. Cl.$^5$ ........................... C08F 6/16; C08F 6/24
[52] U.S. Cl. ................................... 528/496; 528/488; 528/490; 528/491; 528/495; 528/498; 525/243; 525/315; 525/316
[58] Field of Search ............... 528/491, 495, 496, 498; 525/243, 315, 316

[56] References Cited

U.S. PATENT DOCUMENTS 4,284,737  8/1981  Kruse et al. ......................... 525/243
4,401,806  8/1983  Hagiwara et al. ................... 528/498

FOREIGN PATENT DOCUMENTS 0526626  6/1956  Canada ............................... 528/495

OTHER PUBLICATIONS

Chem. Eng. Handbook, J. Perry (ed.) McGraw-Hill, N.Y., 363, 1950.

*Primary Examiner*—Fred Teskin
*Attorney, Agent, or Firm*—Armstrong, Nikaido, Marmelstein, Kubovcik & Murray

[57] ABSTRACT

The present invention provides a method for recovering polymer agglomerates in the form of dry powders or granules comprising steps of:

(A) coagulating a polymer latex obtained by emulsion polymerization or suspension polymerization to thereby form hydrous agglomerates in which latex particles are not fused together, (B) immersing the hydrous agglomerates in an organic liquid insoluble or hardly soluble in water which wets but does not dissolve or swell said agglomerates at a temperature lower than the temperature at which the latex particles constituting the agglomerates are fused together, to thereby substitute said organic liquid for the water contained in the agglomerates with the organic liquid, (C) thereby forming two phases; a water phase expelled from the agglomerates and an organic liquid phase in which the agglomerates are immersed, (D) separating the agglomerates from the organic liquid phase, and (E) removing by evaporation the organic liquid attached to the agglomerates, whereby the agglomerates are recovered as dry particles. Further, this invention provides a method of recovering polymer agglomerates having additional impurities removed therefrom by immersing the aforementioned agglomerates, after having been separated from the organic liquid phase, in a second organic liquid which effects dissolution and extraction of impurities from the aforementioned agglomerates. According to this invention, the drying energy may be greatly cut back, and high purity polymer agglomerates are obtained in the form of dry powders or granules.

20 Claims, No Drawings

METHOD OF RECOVERING POLYMER AGGLOMERATES AS DRY POWDERS OR GRANULES

The present application is a continuation-in-part of application Ser. No. 137,312, filed on Dec. 23, 1987, now abandoned.

BACKGROUND OF THE INVENTION

1. Field of the Invention

The present invention relates to a method for recovering powdery or granular dry polymer agglomerates from a polymer latex obtained by emulsion or suspension polymerization. More particularly, it pertains to a method to enable drying of the polymer to be done with a small amount of drying energy whereby to be able to recover highly pure powdery or granular polymer agglomerates at low cost by substituting for the water contained in agglomerates of polymer latex particles, organic liquid, or dissolving and extracting the emulsifier or impurities remaining in the agglomerates into the organic liquid.

2. Description of the prior art:

Heretofore, emulsion or suspension polymerization, as a method for obtaining polymers by polymerizing monomers, has found wide industrial uses as an excellent polymerizing method, because of its features including ease of control of the polymerization system, realization of high yield of polymerization, and producing a high degree of polymerization, etc. In these methods, first, the latex obtained by emulsion or suspension polymerization is turned into polymer agglomerates by bringing it into contact with a material (coagulant) having coagulating power like salt or acid, etc. The agglomerates are aggregates of latex particles; if the agglomeration is accomplished at a temperature lower than the polymers' softening points, some gaps will be left between latex particles, producing a porous structure containing water in these interstices. If the agglomeration is made at a temperature higher than their softening points, the latex particles will be fused together simultaneously with their agglomeration, enabling closely packed particles to be formed. Even from porous agglomerated particles which have been agglomerated at a temperature lower than their softening points, similar particles may be obtained, if they are heated above their softening points after agglomerization. Porous particles obtained at temperatures lower than their softening points are so weak as to be liable to disintegration into basic particles of latex, with a result that such operations as dehydration, cleaning, drying, etc., will become very difficult to perform on them for this reason, generally the operations of dehydration, cleaning, drying, etc., are performed after the agglomerated particles have been fused into a slurry by heating them above their softening points. When particles are obtained in this way, materials remaining inside these particles are difficult to get out, as a matter of course, so that high purity polymer powders or granules cannot be recovered, however finely are these particles are comminuted. On one hand, this method is disadvantageous in that a large amount of energy is required for evaporating water when drying after dehydration and cleaning, resulting in high cost. On the other hand, materials retained in the interstices of porous agglomerated particles which have been agglomerated at below their softening points, can be more easily removed if sufficient dehydration and cleaning is possible. However, actually, even after conventional dehydration, a large amount of water is still left, which requires consumption of enormous drying energy.

In such a method, because the polymers are recovered as agglomerates of latex particles and are further thermally fused into powders and granules; the emulsifiers (surfactants) and oil soluble materials used for polymerization and impurities formed as by-products during polymerization are brought into a state of being embedded inside the polymer aggregates, so that their removal is very difficult. Thus the admixture of impurities, including emulsifiers, will induce degradation in quality, as evidenced by coloration, reduction in heat resistance, development of burning, etc., in molded products. This is the largest drawback of this method.

In removing impurities, including the above-mentioned emulsifiers, generally, they are extracted from the recovered polymers after they have been dried and pulverized using an organic solvent. However, even when practicing this method, however finely are the polymers pulverized, only the impurities existing on the surface are usually removed. Too fine pulverization will result in difficulty in recovery after extraction, and so forth. Thus the removal is made only imperfectly and in addition, because the extraction operation is performed after the polymers once have been turned into a dry product, a double operation is required after the drying process, which increases the complexity of the process and increases the cost. Thus this method can not, of necessity, be said to be industrially advantageous.

SUMMARY OF THE INVENTION

The object of this invention is to provide a method of recovering polymer agglomerates, in the form of dry powders or granules from a polymer latex, which permits easy removal of materials contained in the interstices of the agglomerates and allows a great reduction in drying energy.

Another object of this invention is to provide a method of recovering polymer agglomerates in the form of dry powders or granules from a polymer latex, with emulsifier and other impurities remaining in the agglomerates being efficiently removed.

Other objects and advantages of this invention will become evident to those skilled in the art from the following detailed description:

In view of the above-described situation, the present inventors, as a result of pursuing their assiduous studies, have found out that the aforementioned purposes may be attained by substituting an organic liquid for the water content in the polymer agglomerates formed from polymer latexes, simultaneously with this substitution, dissolving or extracting the emulsifier or impurities remaining in the agglomerates with the organic liquid, which finding has led to the completion of this invention.

DETAILED DESCRIPTION OF THE INVENTION

The present invention covers a method for recovering polymer agglomerates comprising the steps of;

(A) coagulating a polymer latex obtained by emulsion polymerization or suspension polymerization to thereby form hydrous agglomerates in which latex particles are not fused together.

(B) immersing the hydrous agglomerates in an organic liquid, insoluble or only slightly soluble in water, which wets but does not dissolve or swell said agglomerates, at a temperature lower than at which the latex particles constituting the agglomerates are fused together, to thereby substitute said organic liquid for the water contained in the agglomerates, (C) forming two phases; a water phase expelled from the agglomerates and an organic liquid phase in which the agglomerates are immersed, (D) separating the agglomerates from the organic liquid phase, and (E) removing, by evaporation, the organic liquid remaining attached to the agglomerates, whereby the agglomerates are recovered as dry particles.

Further, the present invention covers a method for recovering and purifying polymer agglomerates comprising:

(A) coagulating a polymer latex, obtained by emulsion polymerization or suspension polymerization, to thereby form hydrous agglomerates in which latex particles are not fused together, (B) immersing the hydrous agglomerates in an organic liquid insoluble or only slightly soluble in water which wets but does not dissolve or swell the agglomerates and which dissolves impurities, at a temperature lower than at which said latex particles constituting the agglomerates are fused together, to thereby substitute water contained in the agglomerates with the organic liquid, (C) forming two phases; a water phase expelled from the agglomerates and an organic liquid phase in which the agglomerates are immersed, (D) dissolving and extracting impurities contained in the agglomerates in the organic phase, (E) separating the agglomerates from the organic liquid phase, and (F) removing, by evaporation, the organic liquid remaining attached to the agglomerates, whereby the agglomerates are recovered as dry particles.

And further, the present invention covers a process of immersing the agglomerates separated from the organic liquid in the aforementioned step (E) in a second organic liquid which does not dissolve or swell the aforementioned polymers, but which dissolves impurities in the aforementioned agglomerates, thereby dissolving and extracting the impurities from the aforementioned agglomerates with the second organic liquid, then, separating the agglomerates from the second organic liquid, and thereafter, removing the second organic liquid with which the aforementioned impurities have been dissolved and extracted, thereby recovering the aforementioned agglomerates as dry powders and granules.

First a polymer latex obtained by polymerization is coagulated into polymer agglomerates using whatever coagulant is capable of coagulating the latex. However, if it is not desired that the coagulant remain in the agglomerated particles, it is only necessary that such material is removable by the later-described operation and that it does not exacerbate the polymers' workability. Generally, the choice is made among acids and salts and an aqueous solution is chosen for ease of coagulating operation. This coagulation should desirably be accomplished at temperatures lower than the softening points of polymers, so that the latex particles will not fuse together. Agglomerate particles having no latex particles fused together are so weak that they are difficult to handle, but this weakness is a function of the solids content of agglomerate particles; the large the solids content, the stronger and more desirable is the agglomerate; normally, they are often handlable as a solid if the solids content is higher than 20% and such operations as dehydration, cleaning and drying are applicable on them. It is possible to set the particles by heating them at higher than their softening points.

Reflecting this situation, there is available, as a desirable coagulating method applied to this invention, a method for letting particles grow, with coagulation seeds scattered in the latex, or a method of forming spherical particles by spraying the latex into a coagulative atmosphere. Coagulated particles obtained by these methods are desirable and this invention can be applied thereto.

By immersing the agglomerates as they are and not in a fused state, in an organic liquid which has an affinity for the polymers, without dissolving or swelling them, and which is insoluble or hard to dissolve in water, water existing inside the agglomerates may be expelled out of the agglomerates, thereby replacing such occluded water with said organic liquid. The organic liquid may be a mixture of two or more liquids. Under these conditions, it is only necessary that the mixed liquid wets the polymers, but does not dissolve or swell them. For example, even a liquid which hardly wets polymers, but does not dissolve nor swell them, may be used as the main component, provided that at least a small amount of liquid which has wetting power, which may incidentally be capable of dissolving polymers,k is mixed therewith.

As soon as the agglomerates are immersed in the aforementioned organic liquid, the agglomerate particles surfaces are wetted thereby, then, the liquid goes on penetrating into the interstices in the surfaces and particles interiors, replacing the water existing there and expelling it. This replacing rate is so rapid that the replacement will be nearly completed in about 10 min., even if the agglomerate particles are macroparticles having diameters exceeding 10 mm. However, as the agglomerates swell or dissolve, the latex particles on the agglomerate particles surfaces and particles in the interior fuse together, thereby forming continuous layers having no particles interstices. Therefore, it will become impossible to continue to replace the water. Moreover, the drying rate thereafter will become very small, thus interfering with industrial treatments.

As a method for immersing the agglomerate particles in the organic liquid, it is appropriate to immerse the agglomerate particles in the organic liquid by merely leaving them intact therein. Placing them is a flow of the organic liquid formed by way of stirring or passing is more effective. However, it is necessary to avoid disintegration of agglomerate particles into a finely comminuted state by stirring or violently turbulent flow and, therefore, the immersing conditions should be selected based on the strength of particles. The amount of organic liquid required for replacement of water is determined so that the agglomerates are immersed in the organic liquid and water inside the agglomerates is replaced therewith; the repelled water and the organic liquid in which the agglomerates are now immersed forming two phases and, moreover, a level of the organic liquid being present which enables the agglomerates to be submerged thereunder. Although the necessary immersing time may not be monolithically set, being determined by the properties of the agglomerates, type or organic liquid and the packing density of the agglomerate particles, etc., it is appropriate to select the type of organic liquid and conditions of operation such that the water content displacement rate is higher than 80% within 10 minutes as a tentative index.

One of the features of this invention is to be able to discharge the water phase very easily since the organic liquid phase containing the agglomerates and water expelled out of the agglomerates form two phases, such that the agglomerates can be recovered from the organic liquid phase alone.

Another feature of this invention is that those impurities contained in the polymer agglomerates which are soluble in water, irrespective of whether it is the water inside the particles or the water adhering onto the surfaces, are brought out of the particles at the time of water-displacement, so that they will not remain inside the particles after drying, yielding high purity polymers. Such oil soluble materials as unreacted monomers, etc., which remain will dissolve in the organic liquid, when replacing the interior water with the organic liquid or when expelling the surface water. Accordingly their effective removal will become possible by reducing the concentration of said oil soluble impurities in the organic liquid.

After replacing water inside the particle with organic liquid or expelling water from the external surfaces of particles, the agglomerates are turned into powders or granules through removal of liquid, cleaning and drying. At this time, if it is necessary to avoid disintegration of agglomerates into fine powders, heating the polymers to a temperature higher than their softening points is appropriate.

Thus the polymers taken up as the object to which this invention is to be applied are agglomerates of the latex obtained by emulsion or suspension polymerization; the agglomerates are packed aggregates of latex particles being composed of particles, but they are not fused to each other. Accordingly, they are porous agglomerates having voids in the interstices between particles. Normally, such agglomerates envelop a large amount of water and a large amount of energy is required, but by replacing it with such an organic liquid, latent heat of evaporation may be drastically reduced, thereby realizing a great savings of energy. And since the organic liquid which replaces the water is insoluble or hard to dissolve in water, reclamation of the organic liquid may be made readily and at low cost. Thus if the agglomerates are porous, the replacement of water with organic liquid and the removal of the organic liquid remaining thereafter becomes rapidly and readily performable. For the reasons hereabove described, production of high purity polymers at high efficiency and low cost from the latex obtained by emulsion or suspension polymerization becomes possible for great industrial benefit.

In order to obtain high purity polymer agglomerates further removed of impurities according to this invention, the agglomerates are immersed in a second organic liquid to adopted to dissolve oil soluble impurities because of its affinity therefore, whereby agglomerates having water as well as water soluble impurities extracted from the interiors of the agglomerate particles. At this time, the first organic liquid, mainly used as a replacement for occluded water, and the second organic liquid, used for extraction of organic liquid, need not be identical. The first organic liquid, mainly used as a replacement for occluded water, is desired to be reclaimed for economic reasons and the solvent dissolved in the water phase can be recovered by steam distillation, etc. In this sense, if the liquid is insoluble in water, the liquid is readily recoverable by the simple operation of oil-water separation, and is therefore of further advantage. Since the emulsifier and the oil soluble material to be removed in the process of extraction need to be soluble in the extracting liquid, selection of an optimal liquid is necessary. Whether the extracting liquid is soluble in water or not will no longer raise problems, but when the extracting operation is conducted continuously or simultaneously, there will arise the need to separate the liquid for water replacement and the liquid for extraction from each other; accordingly, choosing the same liquid for both purposes will be advantageous. If the first organic liquid is capable of dissolving oil soluble impurities, the extraction of oil soluble impurities is also started simultaneously as the displacement the water inside the agglomerate particles is displaced with the organic liquid. Accordingly, in this instance, separate extraction is not necessary, but the extraction may be made continuously by changing the type of organic liquid and so forth. If the emulsifier is normally hard to dissolve in the liquid, it may be made readily soluble before the replacement of water with organic liquid. For example, if the emulsifier is a sodium salt of a fatty acid and an inorganic salt is used as the coagulant, the emulsifier will exist in the form of a metal salt of a fatty acid and, therefore, will be hard to dissolve in an organic liquid irrespective of the type of metal salt. In this instance, the emulsifier may be readily removed by extraction by converting such into the free fatty acid from by preliminary addition of acid to the agglomerates.

General solid-liquid extraction operation is applicable to this extraction. Thus, there is employed a method of extracting the materials to be extracted in the agglomerates with liquid and, then the extractant is removed in the extractor by such refining treatments as distillation, adsorption, etc., thereby reclaiming it. The extraction will rapidly proceed through the surfaces of the agglomerate particles or interstices between latex particles.

Agglomerates from which extraction has been accomplished are turned into powders or granules through removal of liquid, cleaning and drying. At this time, if it is necessary to avoid disintegration of agglomerates into fine powders, it is only necessary to heat the polymers to above their softening points.

The polymer latices, as objects to which this invention is applicable, are almost all of polymers obtained by emulsion or suspension polymerization which are recoverable in resin form.

Single or mixed latices of polymer latices formed by polymerization, copolymerization or graft polymerization of monomer compositions with one or more members of monomers selected from among each monomer group listed hereunder as their main components may be used as the objects to which this invention is applicable. It goes without saying, however, that monomer compositions which are not polymerizable are excluded Vinyl aromatics such as styrene, monochlorostyrene, dichlorostyrene, α-methyl styrene, etc.; vinyl cyanides such as acrylonitrile, methacrylonitrile, etc.; acrylates such as methyl acrylate, ethyl acrylate, butyl acrylate, etc.; methacrylates such as methyl methacrylate, ethyl methacrylate, butyl methacrylate, etc.; vinyl halides such as vinyl chloride, vinyl bromide, vinyl fluoride, etc.; vinylidene halides such as vinylidene chloride, vinylidene bromide, etc.; acrylic acid, methacrylic acid, itaconic acid maleic acid, vinyl acetate, ethylene, propylene, butylene, butadiene, isoprene, chloroprene; crosslinking monomers such as allyl methacrylate, diallyl phthalate, triacyl cyananurate, monoethylene glycol dimethacrylate, tetraethylene glycol dimethacrylate, tetraethylene glycol dimethacrylate, divinyl benzene, glycidyl methacrylate, etc.

Further, in practicing this invention, polymer latices given hereunder will be particularly preferable employed;

(1) Polymer latex obtained by polymerization of monomers consisting of 20-80 parts of acrylonitrile monomer, 20-80 parts of one member or two or more members in mixture of vinyl chloride, vinylidene chloride, vinyl bromide and 0-10 parts of easily dyable monomers.

(2) Butadienic polymer latex consisting of 0-50% by weight (% is hereinafter referred to % by weight unless specified as other type of %) of styrene and 50-100% of butadiene.

(2') Polymer latex obtained by polymerizing, in the presence of 20-80 parts of butadienic polymer latex as mentioned above in (2), 20-80 parts of monomer comprising 0-50% of acrylates, 0-100% of methacrylates, 0-90% of vinyl aromatics, 0-90 of vinyl cyanides and 0-20% of other copolymerizable monomers.

(3) Polymer latex obtained by polymerizing 80-100 parts of monomers comprising 0-100% of methyl methacrylate, 0-60% of other methacrylate esters exclusive of methyl methacrylate or acrylates, 0-90% of vinyl aromatics and 0-90% of vinyl cyanides in the presence of 0-20 parts of a rubbery polymer latex composed of 0-50% of styrene, 50-100% of butadiene and 0-30% of acrylates.

(4) A mixed latex of 0-50 parts of graft copolymer (A) formed by polymerizing 10-90 parts of one or two or more members of monomers selected from among vinyl aromatics, methacrylates, acrylates and vinyl cyanides in the presence of 10-90 parts of butadienic polymer composed of 0-50% of styrene and 50-100% of butadiene, and 50-100 parts of polymer (B) formed by polymerizing monomers including 0-70 mol-% of α-methyl styrene and 30-100 mol-% of one or two or more members of monomers selected from among vinyl aromatics, methacrylates, acrylates, acrylic acid and vinyl cyanides.

(5) Polymer latex obtained by polymerizing 15-95 parts of one or two or more members of monomers selected from among methacrylates, vinyl cyanides, acrylates, vinyl aromatics and monomers copolymerizable therewith, in the presence of 5-85 parts of rubber polymer obtained by polymerizing 40-100% of acrylates, 0-60% of one or two or more members of monomers selected from among vinyl aromatics, vinyl cyanides, vinyl chloride, vinylidene chloride, vinyl acetate or conjugated diolefins and 0-10% of crosslinking agents.

(6) Polymer latex obtained by polymerizing 40-100 parts of vinylidene chloride with 0-60 parts of one or two or more members of monomers selected from among vinyl aromatics, vinyl cyanides, acrylates, methacrylates, acrylic acid, methacrylic acid, itaconic acid, maleic acid and crosslinking monomers.

(7) Polymer obtained by polymerizing 40-100 parts of vinyl chloride and 0-20 parts of vinyl cyanides with 0-60 parts of one or two or more members of monomers selected from among vinylidene chloride, vinyl bromide, vinylidene bromide, acrylates, acrylic acid, methacrylic acid, itaconic acid, maleic acid and crosslinking monomers.

As the coagulants which are used for producing agglomerates by coagulating a polymer latex, whatever compounds which enable coagulation of the polymer latex is acceptable. Generally, the selection is made based on the polymer's use, maneuverability, cost, etc. They include, for example, inorganic salts such as sodium, potassium and lithium chlorides, sodium, potassium and lithium bromides, potassium iodide, potassium, ammonium and sodium sulfates, ammonium chloride, sodium and potassium nitrite, calcium chloride, ferrous, magnesium, zinc and copper sulfates, barium, ferrous, magnesium and ferric chlorides, ferric and aluminum sulfates, potassium and iron alums, etc., inorganic acids such as hydrochloric, sulfuric, phosphoric, nitric acids, etc., inorganic alkalis such as caustic soda and potash, calcium and magnesium hydroxides, etc., organic acids such as acetic, formic acids, etc., salts of organic acids such as sodium and calcium acetates, sodium and calcium formates, etc. They are available as solid, liquid, aqueous solutions of solution in water soluble organic solvents.

The organic liquid used for the replacement of water inside the agglomerates should of necessity (1) wet (be affinitive with) the agglomerate molecules, but (2) not dissolve or swell them and (3) be hard to dissolve or insoluble in water and to facilitate reclaiming it by separating it from the water which has been expelled from agglomerates organic solvents which are insoluble in water are most advantageous. With regard to the aforementioned (1) and (2), the difference between the surface tension to polymers and the solubility parameter (SP value) is considered to be an index.

The condition for wetting polymers is only that the surface tension of the liquid should be smaller than the critical surface tension of the polymers. The wetting mentioned here corresponds to the immersional wetting representing the liquid penetrating into inside the agglomerate particles. This wetting is determined by the interfacial tension, the wetting being believed to be induced by reduction in interfacial tension between solid and liquid. In particular, the interfacial free energy between the agglomerate particles and the organic liquid should be smaller than between the agglomerate particles and water. Although this value, of course, differs, depending on type of polymer, in most cases, if it is smaller than 30 dyne/cm, replacement of the water is considered feasible. For avoidance of dissolution and swelling of polymers, it is assumed proper to set the dissolution parameter difference which is regarded as the guide, at about 1.5-2.0. However, actually, it may differ depending on the operating temperature, or as a function of the degree of polymerization of the macromolecule or the structure of the copolymer. If the solution or polymers are mixtures of two or more types, the selection based on the SP value is virtually impractical. Whichever the case, the possibility of dissolution and swelling may be readily and quickly examined by one mixing the organic liquid and the polymer with each other. Accordingly, the selection on the basis of SP value implies preliminary selection.

As such organic liquids, there are available, for example, hydrocarbons, halogenated hydrocarbons, alcohols, ethers, acetals, ketones, esters, polyhydric alcohols, polyhydric alcohol derivatives, phenols, and organic liquids of nitrogen, sulfur and phosphorous compounds. In selecting the liquid, the selection range is greatly narrowed from that defined by the conditions of prohibiting dissolution and swelling. On this account hydrocarbons and alcohols are often adaptable. For meeting the requirements of aforementioned (1), (2) and (3), mixed liquids of two or more types are sometimes employed.

In general, paraffins, cyclic hydrocarbons and their alkyl-substitutes are insoluble in water, but those having high molecular weights will swell polymers. Alcohols with high molecular weights are hard to dissolve in water, but cause polymers to swell. Accordingly, as organic liquids to be singly used, hydrocarbons with carbon number from 4 to 7 and alcohols with carbon numbers from 4 to 5 are often selected. When mixed solvents are used, mixtures of alcohols with carbons numbers of 1-5 with hydrocarbons with carbon numbers of 4-7 as their main component are often selected. Further, since the agglomerates should be obtained as powders or granules of polymers by drying them after the extraction, optimal organic liquids must be selected, taking account of such matters as dryability (boiling point and latent heat of evaporation) and safety during working time, etc., and further, cost.

It should be more convenience from an operating standpoint, if the second organic liquid for use in extraction of impurities is identical with the first organic liquid for use in replacement of water. Under such conditions, capability of dissolution of materials to be extracted is added to the conditions for selection, but since generally most organic liquids are capable of dissolving organic substances, such as emulsifiers or oily materials, this condition does not require much consideration. However, if the organic liquid has dissolved a substantial amount of water, the solubility of organic substances therein will decline, for which care is necessary. On the other hand, when a liquid different from one for replacement of water is used as the extraction liquid, it is proper to contact the agglomerates with the extraction liquid after the former liquid has been drained off. At this time, the agglomerates have already lost water content, so that solubility in water becomes irrelevant. It is only important that the liquid merely can dissolve the materials to be extracted, but does not effect dissolution and swelling of the agglomerates, thus facilitating selection. Further, since the agglomerates will be obtained as powders or granules of polymers by drying them after the extraction, an optimal organic liquid must be selected, taking account of dryability of the solvent (boiling point and latent heat of evaporation), the aspect of the safety at the time of operation and further, the cost of this process.

Emulsifiers which are regarded as the object to be removed are those used for emulsion and suspension polymerization. Generally, two or more types of emulsifiers are used in combination, but there may be mentioned the following compounds as representative emulsifiers: anionic surfactants, such as sodium and potassium salts of fatty acids are representative and are utilized in almost all polymerization system. They include sodium and potassium salts of saturated fatty acids like palmitic acid and stearic acid, and unsaturated fatty acids like oleic acids like oleic acid, or natural substances such as rosin, caster oil, palm oil and beef tallow, etc. Besides fatty acids, they include higher alcohol sulfuric acid esters, sodium alkyl benzene sulfonate, alkyl diphenyl ether disulfonate, polyoxyethylene alkyl ether sulfate, etc. On the other hand, nonionic surfactants are sometimes employed; they include polyethylene glycol and polyoxyethylene sorbitan esters, etc.

Of anionic surfactants, salts of carbonic acids and sulfonic acids are hard to dissolve in organic liquids and, therefore, it is preferred that they be in their respective acid form for removal by extraction at higher efficiency. Thus the polymer latex, if coagulated using acids, will be in acid state, but when it is coagulated using salts, it is recommended to add acid after coagulation. Normally with sodium salts of fatty acids, the extraction rate will be about 1/5-1/10 of that with free fatty acids. Nonionic surfactants raise no problem in their unmodified state.

As oil soluble impurities, very wide varieties of materials are considered to be included, such as impurities and inclusions contained in main and auxiliary materials used for polymerization, including various monomers, polymerization initiators, etc., surfactants and other aids for improving dispersion stabilization, etc., unreacted residues, decomposed products formed as by-products in the polymerization reaction system, and low molecular weight reaction products like dimers, trimers, etc. Accordingly, the extracting liquid should be selected to suit the object of removal.

The softening point means the temperature at which the latex particles fuse together; it may be generally considered to be the melting point. However, so far as polymers are concerned, it is not determined by the degrees of polymerization or their distribution, but is greatly influenced by crystallinity or impurities which give plastic effect. However, actually, it may be considered to fall within a range of $$\frac{Tg + 273}{0.8} - 273 \frac{Tg + 273}{0.6} - 273 (°C.)$$

wherein Tg is the glass transition point in ° C. In a specific practice of this invention, the rough value of the softening point may be ascertained, if the rough value of the polymer's Tg is determined. Accordingly, by trying the experiment at 2-3 temperatures, an optimal temperature may be readily found.

Appropriateness of the aforementioned formula will be confirmed as a result of observation to see whether latex particles have fused together or not by observing the interior of the particles obtained by operations run at various temperatures with a scanning type of electron microscope.

The present invention makes it possible not only to attain a great deal of saving in energy, but also removes impurities in the polymerization system, whether they are water-or-oil-soluble, by forming latex particles as porous agglomerates which are not fused together and drying them after replacing the water content in said agglomerates with organic liquid, then forming two phases, i.e., a water phase expelled and an agglomerates immersing organic liquid phase, thereafter recovering the agglomerates from the organic liquid phase and removing the organic liquid attached to the agglomerates and further removing impurities efficiently through dissolution and extraction by immersing them in a second organic liquid which dissolves the impurities, thereby yielding high purity polymers at low cost and advantageously.

In the following, the present invention will be described in connection with some embodiments thereof and comparative examples, but it will no way be restricted by them.

EXAMPLE 1

One liter of a polymer latex with a solids content in the latex of 30% and having residual monomers-2.,8% of α-methyl styrene monomer and 1.7% of styrene monomer in proportion to the solid content and held at 30° C., being a polymer latex comprising in mixture 33% of a polymer latex (A) formed by graft-copolymerizing a mixture of styrene, acrylonitrile and methyl methacrylate on butadiene polymer, which is composed of 60% butadiene, 10% methyl methacrylate, 10% acrylonitrile and 20% styrene, and 67% of copolymerized polymer latex (B) composed of 20% α-methyl styrene, 25% acrylonitrile and 55% styrene was placed in a 1 liter beaker and the mixture was stirred at 300 rpm at room temperature, using a scooping-up 3 vane propeller with d/D=0.5. As a coagulant, (1) a 10% aqueous solution of hydrochloric acid and (2) a 30% aqueous solution of calcium chloride were added to the latex, to be dispersed therein, and about 10 seconds later, the mixture was treated for 10 minutes, while gently stirring it at a rotational frequency of 100 rpm. Then coagulated particles were separated from said polymer latex by passing the product through a 32 mesh sieve. The coagulated particles were spherical particles having such a sharp particle size distribution that more than 90% of them were larger than 4–10 mesh and the coagulated particles' solid content was 35–38%. The coagulated particles were further dispersed in water and then dehydrated by passing them through a 32 mesh sieve after holding them for 15 minutes with their temperature raised to 85° C., yielding samples (1) and (2). Dehydrated particles with their pH adjusted to 10.5 by an aqueous solution of potassium hydroxide, while heating to and holding at 85° C. were produced from coagulated particles obtained by similar operation as with (1), and were set up as sample (3); and particles prepared by heating and dehydration with pH adjusted to 2.0 with an aqueous solution of hydrochloric acid, when dispersing coagulated particles in water by a similar operation as with (2), were set up as sample (4), to be used in extraction.

In all samples (1)–(4), particles contracted by heating treatment at 85° C. and, as a result, their solid content increased to 50–55%.

Fifty grams of the aforementioned water containing particles were taken and put in a 10 mesh wire net container; the particles were, then, immersed in 150 ml of various organic liquids held at constant temperatures, as shown in Table 1. And the SP value and surface tension (at 20° C.) of the organic liquids used are given in Table 2.

It should be noted that the aforementioned polymer's softening point was found to be 92° C., estimated SP value 9.3±2, and estimated critical interfacial tension 33±2 dyne/cm.

TABLE 1

| Test | Particles | Liquid | Temperature (°C.) | Immersion time (min) | Rate of water removal (1) (%) | α-Methyl styrene (2) (%) | Styrene (2) (%) |
|---|---|---|---|---|---|---|---|
| A | (1) | n-Hexane | 55 | 5 | 85 | 1.52 | 0.76 |
| B | (2) | n-Hexane | 55 | 10 | 92 | 1.49 | 0.77 |
| C | (3) | n-Hexane | 55 | 15 | 97 | 1.44 | 0.73 |
| D | (4) | n-Hexane | 55 | 5 | 87 | 1.64 | 0.81 |
| E | (1) | 2-Butanol | 30 | 10 | 89 | 1.69 | 0.87 |
| F | (2) | 2-Butanol | 30 | 20 | 91 | 1.61 | 0.82 |
| G | (2) | Hexane/isopropanol = 80/20 (ratio by volume) | 60 | 3 | 90 | 1.49 | 0.78 |
| H | (4) | Hexane/isopropanol = 80/20 (ratio by volume) | 60 | 2 | 82 | 1.59 | 0.84 |
| I | (1) | n-Pentane/acetone = 95/5 (ratio by volume) | 30 | 5 | 80 | 1.76 | 0.77 |
| J | (4) | n-Pentane/methanol = 70/30 (ratio by volume) | 20 | 10 | 89 | 1.79 | 0.89 |
| K | (1) | n-Butanol/ethanol = 70/30 (ratio by volume) | 30 | 10 | 91 | 1.67 | 0.84 |
| L | (4) | Cyclohexane/benzene = 95/5 (ratio by volume) | 40 | 10 | 83 | 1.76 | 0.86 |

Notes:
(1) In measuring the water removal rate, water contents of the sample before and after its immersion test were measured by the Karl-Fischer method, and the rate was calculated from this ratio. The water removal may be regarded as the rate of substitution of water by organic liquid.
(2) The determination of both α-methyl styrene and styrene was made by gas chromatography. The monomer's equilibrium concentration is approx. 0.79% for α-methyl styrene and approx. 0.48% for styrene.

TABLE 2

|  | SP-Value | Surface tension (dyne/cm) | Solubility in water |
|---|---|---|---|
| n-Hexane | 7.3 | 18.4 | Insoluble |
| Cyclohexane | 8.2 | 25.0 | Insoluble |
| n-Pentane | 7.0 | 16.0 | Insoluble |
| n-Heptane | 7.4 | 20.3 | Insoluble |
| Acetone | 9.9 | 23.3 | Soluble |
| Methanol | 14.5 | 22.5 | Soluble |
| Ethanol | 12.9 | 22.6 | Soluble |
| n-Butanol | 11.4 | 24.7 | Hard to dissolve |
| 2-Butanol | 10.8 | 24.0 | Hard to dissolve |
| Isopropanol | 11.5 | 21.0 | Soluble |
| Benzene | 9.2 | 28.9 | Insoluble |

The above table clearly shows that expelling of water is done quite rapidly and judging from the aforementioned monomers' equilibrium concentrations, a very high rate of extraction is indicated. It should be noted that during the aforementioned operation, the particles maintained their spherical form without undergoing breakdown making unification.

COMPARATIVE EXAMPLE 1

Particles obtained by a similar method as in Example 1 were heated to 95° C. instead of 85° C. and with the particles so obtained, the same tests were conducted, using the same organic liquids as in Example 1.

Even when the particles were immersed in the organic liquid, only a very small amount of water, which seemed to have been sticking on the particle surfaces, was seen at the bottom of the container; thus, it is clearly shown that the water inside the particles was not removed. From the fact that particles, after being subjected to extraction, are quite difficult to dry, in addition to the aforementioned evidence, the surface and the interior of the particles are believed to have turned into fused particles by raising the temperature to 95° C. In whichever test, for both α-methyl styrene and styrene, the reduction stayed at 5-10%, and a reduction of 20% could not be attained, even when the treating time was further extended to 1 hour.

COMPARATIVE EXAMPLE 2

With particles obtained by a similar operation as was run in Example 1, an extraction operations was performed similarly to in Example 1, using the liquids at the temperature as given in Table 3.

TABLE 3

| Test | Par- ticles | Liquid | Tempera- ture (°C.) | Immersing time (min) | Rate of water removal (%) | α-Methyl styrene (%) | Styrene (%) |
|---|---|---|---|---|---|---|---|
| A | (1) | Ethanol | 55 | 30 | 61 | 2.5 | 1.6 |
| B | (2) | n-Hexanol | 60 | 30 | 19 | 1.8 | 1.0 |
| C | (3) | n-Hexane/ acetone = 50/50 (ratio by volume) | 60 | 30 | 22 | 1.8 | 1.2 |
| D | (4) | 2-Butanol/ benzene = 70/30 (ratio by volume) | 50 | 30 | 26 | 2.2 | 1.6 |
| E | (1) | n-Butanol/ dichloromethane = 80/20 (ratio by volume) | 30 | 30 | 23 | 2.0 | 1.2 |
| F | (4) | Isopropanol | 60 | 30 | 58 | 2.5 | 1.7 |

In tests A and F, no fusion was recognized in the particles, after being subjected to the extraction, and the oil and water layers were not separated. Other particles tested swelled, and appeared to be in their fused state, with a small amount of water phase separated at the bottom of the beaker.

In the aforementioned extraction removal, even though the immersion time was extended to 1 hour, the rate of water removal did not rise. In this way, the substitution of water with liquid was inadequate, and with B, C, D and E; drying was very difficult, when the temperature was raised above 70° C., a phenomenon of particles swelling was observed.

EXAMPLE 2

A polymer latex formed by graft-polymerizing a mixture of styrene and methyl methacrylate on a copolymer of styrene and butadiene, which was composed of 35% styrene, 20% methyl methacrylate and 45% butadiene, and which had a softening point of 67° C., had a 30% solid content and was held at 30° C., was sprayed into a cylindrical coagulation chamber through a hollow cone nozzle, a kind of hydraulic spray nozzle. The sprayed latex droplets had a mean liquid diameter of 220 microns.

Warm water, held at 45° C., as a recovering liquid, was let flow down on the inner wall surface from side spray nozzles installed at the inner wall top; inside this chamber, a 10% aqueous solution of hydrochloric acid held at 15° C. was dispersed into less than 100 micron fine liquid droplets with 0.6 kg/cm$^2$ of steam through an internally mixing type two liquid nozzle with a bore 2.0 mm, thereby forming, in the interior of the chamber, a coagulative atmosphere held at a temperature of 42°-45° C. and a pressure of atmospheric pressure.

The liquid droplets of latex which were dispersed were coagulated by making contact with the coagulant, while falling down the coagulation chamber, and collected by the recovering liquid, to be taken out of this coagulation chamber as a slurry. The coagulated parties of the latex in the slurry thus taken out of the coagulation chamber were found to be nearly perfectly spherical independent particles which had barely undergone breakdown or agglomerated. This slurry was heated at 60° C. while stirring and after holding for 10 minutes, the coagulated particles were taken out by a centrifugal dehydrator, making use of a filtering cloth. The coagulated particles had a mean particle diameter of 200 microns and were in the shape of a nearly perfect sphere; the solid content was 53%. These coagulated particles were found to contain 8,900 ppm of residual styrene monomer.

Fifty grams of the water containing coagulated particles were taken and put in 150 ml of each of the undermentioned liquids held at definite temperatures in a beaker and after holding them for a specified time, while lightly stirring, they were taken off by draining in a Nutche. The water content was determined by Karl-Fischer titration, and the amount of styrene was measured by gas chromatography. The moisture inside the particles before test was titrated by the Karl-Fischer method. The results are shown in Table 4. It should be noted that this polymers' SP value was 8.8 ±2, and its estimated critical interfacial tension was 34±2 dyne/cm.

TABLE 4

| Test | Liquid | Temperature (°C.) | Immersion time (min) | Rate of water removal (%) | Amount of styrene (1) (ppm) |
|---|---|---|---|---|---|
| M | n-Hexane | 60 | 10 | 93 | 3320 |
| N | 2-Butanol | 40 | 10 | 84 | 4210 |
| O | n-Hexane | 30 | 10 | 89 | 3900 |
| P | n-Hexane/ isopropanol 5:1 (ratio by volume) | 50 | 10 | 98 | 3590 |
| Q | n-Pentane/ ethanol = 80/20 (ratio by volume) | 30 | 10 | 95 | 3470 |

Note:
(1) The equilibrium concentration of styrene is 2520 ppm.

In all the tests above-listed, within several minutes after immersion of the particles in the organic liquid, water was expelled from the particles, and accumulated in the bottom of the beaker, forming two phases. The particles existed at the bottom of the upper phase organic liquid. The stirring used was such a calm one as not to allow dispersion of the water accumulated at the bottom into the liquid. After this extraction operation, the particles maintained their spherical shape without undergoing breakdown or merging.

COMPARATIVE EXAMPLE 3

Particles obtained by heating the slurry obtained by the similar operation as in Example 2 to 82° C., instead of 60° C., were subjected to similar tests with the same organic liquids as in Example 2.

In all these tests, reduction in the residual styrene monomer content showed a decrease of only 10-15% from the initial content and barely a further decrease was evidenced, even when the extraction time was further prolonged by 1 and 2 hours. Even when the particles were immersed in the organic liquid, only a small amount of water, which seemed to have been sticking on particle surfaces, was found at the bottom of the beaker. Thus it was recognized, without measuring the residue of water, that the water inside the particles obviously was not expelled. Both this phenomenon, and the fact that the dryability of particles after being subjected to extraction was very poor, suggest that the surface and the interior of particles fused as the temperature was raised to 82° C.

COMPARATIVE EXAMPLE 4

Particles obtained by the similar operation as in Example 2 were subjected to similar extraction operation as in Example 2 with the organic liquids and at the respective temperatures undermentioned. The results are given in Table 5.

TABLE 5

| Test | Liquid | Temperature (°C.) | Immersion time (min) | Removal rate of water (%) | Amount of styrene (1) (ppm) |
|---|---|---|---|---|---|
| G | Methanol | 40 | 30 | 53 | 8250 |
| H | n-Propanol | 50 | 30 | 49 | 8100 |
| I | Benzene | 50 | 30 | 14 | 7780 |
| J | Acetone | 30 | 30 | 9 | 8060 |
| K | n-Hexanol | 60 | 30 | 25 | 7920 |
| L | n-Hexane/ acetone 50:50 (ratio by volume) | 50 | 30 | 33 | 7730 |

In tests G and H, no fusion was observed in particles after being subjected to extraction, and no separated phase of water appeared at the bottom of the beaker. In tests I, J, K and L, the particles were swelled into softened and fused state. Particularly, in I and J, particles were mutually unified and agglomerated. In I, J, K and L, only a very small amount of water seemed to have been expelled; only scant water was found remaining at the bottom of the beaker.

The above-mentioned test results were confirmed to be barely altered, even when the immersion time was prolonged to 1 hour. In tests I, J, K and L, drying was very difficult after dehydration; a phenomenon suggesting that the interiors of the particles swell as the temperature was raised.

EXAMPLE 3

A high molecular latex comprising in mixture 33% of a polymer latex (A) formed by graft-copolymerizing a mixture of styrene, acrylonitrile and methyl methacrylate on butadiene polymer formed by emulsion polymerization, using potassium rhodinate, which is composed of 60% butadiene, 10% methyl methacrylate, 10% acrylonitrile and 20% styrene, and 67% of a copolymer latex (B) composed of 20% α-methyl styrene, 25% acrylonitrile and 55% styrene, with sodium palmitate as the emulsifier, said polymer latex having a solid content in the latex of 30% and containing carboxyl groups of potassium rhodinate and sodium palmitate at 0.097 millimol per 1g of polymer solid content and having residual monomers of α-methyl styrene monomer 2.8% and styrene monomer 1.7%, similarly in proportion to the solid content, and being held at a temperature of 30° C., was placed in a beaker and stirred at room temperature using a scooping up three vane propeller turned at 300 rpm. As the coagulants, (1) a 10% aqueous solution of hydrochloric acid and (2) a 30% aqueous solution of calcium chloride were added to this polymer latex, to be dispersed therein, and about 10 seconds later, with the number of revolutions of the propeller set to 10 rpm, the latex was treated for 10 minutes, while gently stirring it. Then the agglomerate particles were separated from said polymer latex by passing them through a 32 mesh sieve. The agglomerate particles were spherical particles with such a sharp particle size distribution that more than 90% of the agglomerate particles had a size of 4–10 mesh an the solid content of the agglomerate particles was 35–38%. The agglomerate particles were further dispersed in water and then dehydrated by passing them through a 32 mesh sieve, after holding them for 15 minutes with their temperature raised to 85° C., to become samples (1) and (2) for extraction. The agglomerate particles obtained by a similar operation as in (1) which were dehydrated after adjusting their pH to 10.5 with an aqueous solution of potassium hydroxide, while heating the particles to 85° C. and holding them at this temperature, were set as sample (3), and the particles dehydrated by heating after adjusting their pH to 2.0 with an aqueous solution of hydrochloric acid, when dispersing the coagulated particles in water by the similar operation as in (2), as sample (4) to be used in the extraction.

In all samples (1)–(4), particles were shrunk by a heating treatment at 85° C., and consequently, their solid content increased to 50–55%.

Fifty grams of the aforementioned water containing particles were taken, put in a 10 mesh wire net container and immersed in a 150 ml organic liquid held at a constant temperature. Then, the particles were taken out 30 minutes later and the amount of carboxyl group and of monomers contained in the particles were measured.

The softening point of the aforementioned polymer was 92° C., estimated SP 9.32±2, and the estimated critical interfacial tension 33±2 dyne/cm.

above mentioned, the water inside the particles were expelled within several minutes, after they had been immersed in the first organic liquid, and accumulated at the bottom of the container.

In the aforementioned tests a, e and h, particles were taken out 10 minutes after their immersion, liquid was drained off the particles, and the particles were, then, immersed in 150 ml of ethanol, methanol and propanol respectively at 40° C.; they were taken out 20 minutes later and their carboxyl group content and residual monomer amounts were measured. The results showed that the extraction rate was equivalent to that of a.

In this operation, the particles could be kept in spherical form, without undergoing breakdown or merging.

COMPARATIVE EXAMPLE 5

With particles obtained by a similar operation as in Example 3 which were heated to 95° C. instead of 85° C., tests were conducted with the same organic liquids as used in Example 3.

Even when particles were immersed in organic liquid, only a very small amount of water, which seemed to have been sticking on the particle surfaces was seen at the bottom of the container; the water inside the particles was obviously not discharged. From this, and in view of the notable poor dryability of particles after having been subjected to extraction, the particle surfaces and interior are believed to have been fused by raising the temperature to 95° C. In whichever test, the reduction in content from the initial value stayed at 10–15% for carboxyl group and 10–20% for residual monomer and almost no reduction was observed, even

TABLE 6

| Test | Particles | Liquid | Temperature (°C.) | Carboxyl group content (milimol/g) | α-Methyl styrene (%) | Styrene |
|---|---|---|---|---|---|---|
| a | (1) | n-Hexane | 55 | 0.031 | 0.87 | 0.54 |
| b | (2) | n-Hexane | 55 | 0.078 | 0.89 | 0.57 |
| c | (3) | n-Hexane | 55 | 0.065 | 0.89 | 0.56 |
| d | (4) | n-Hexane | 55 | 0.034 | 0.94 | 0.59 |
| e | (1) | 2-Butanol | 30 | 0.036 | 0.94 | 0.60 |
| f | (2) | 2-Butanol | 30 | 0.076 | 0.96 | 0.61 |
| g | (2) | Hexane/isopropnol = 80/20 (ratio by volume) | 60 | 0.068 | 0.84 | 0.57 |
| h | (4) | Hexane/isopropnol = 80/20 (ratio by volume) | 60 | 0.028 | 0.89 | 0.61 |
| i | (1) | n-Pentane/acetone = 95/5 (ratio by volume) | 30 | 0.041 | 1.01 | 0.54 |
| j | (4) | n-Pentane/methanol = 70/30 (ratio by volume) | 20 | 0.043 | 0.99 | 0.62 |
| k | (1) | n-Butanol/ethanol = 70/30 (ratio by volume) | 30 | 0.040 | 0.92 | 0.59 |
| l | (4) | Cyclohexane/benzene = 95/5 (ratio by volume) | 40 | 0.047 | 0.91 | 0.58 |

*The determination of carboxylic acid is made by conductometric titration, and that of α-methyl styrene and styrene by gas chromatography.

The equilibrium concentration, by extraction, of carboxyl group is approximately 0.027 millimol/g; thus, it is considered certain that its rate of removal is large in all cases and particularly, in a and h, it is nearly completely removed. Since the equilibrium concentration of monomer is approximately 0.79% for α-methyl styrene, and approximately 0.48% for styrene, all tests are regarded as showing high rates of extraction. In all tests when the extraction time was further prolonged by 1 or 2 hours.

COMPARATIVE EXAMPLE 6

Particles obtained by the similar operation as in Example 3, were subjected to an extraction operation similarly as in Example 3 with the liquids and at respective temperatures listed in Table 7.

TABLE 7

| Test | Particles | Liquid | Temperature (°C.) | Carboxyl group content (milimol/g) | α-Methyl styrene (%) | Styrene |
|---|---|---|---|---|---|---|
| a | (1) | Ethanol | 50 | 0.092 | 2.5 | 1.5 |
| b | (2) | n-Hexanol | 60 | 0.096 | 1.8 | 1.0 |
| c | (3) | n-Hexane/acetone = 50/50 (ratio by volume) | 60 | 0.097 | 1.7 | 1.2 |
| d | (4) | 2-Butanol/benzene = 70/30 (ratio by volume) | 50 | 0.089 | 2.3 | 1.6 |
| e | (1) | n-Butabol/dichloromethane = 80/20 (ratio by volume) | 30 | 0.095 | 2.2 | 1.1 |
| f | (4) | Isopropanol | 60 | 0.090 | 2.4 | 1.5 |

In tests a and f, no fusion was recognized in the particles, after being subjected to the extraction, but other test particles swelled into a fused state. In b, c, d and e, 20-25% of the water in the particles was discharged and accumulated at the bottom of the container. In a and f, the water phase was not separated.

The aforementioned removal by extraction did not increase, even if the extraction time was prolonged to 1 hour. As above described, the extraction was made only with a very low efficiency and in b, c, d and e, drying was very difficult after removal of liquid; a phenomenon of particles swelling was observed when the drying temperature was raised above 70° C.

EXAMPLE 4

A polymer latex formed by graft-polymerizing a mixture of styrene and methyl methacrylate on a copolymer of styrene and butadiene using potassium rhodinate and half-hardened beef tallow fatty acid sodium salt, which was composed of 35% styrene, 20% methyl methacrylate and 45% butadiene. The polymer latex, which had a softening point of 67° C., had a 30% solid content and was held at a temperature of 30° C., was sprayed into a cylindrical coagulation chamber through a hollow cone type of pressure nozzle. The latex liquid droplets thus sprayed had a mean liquid droplet diameter of 220 microns.

On the other hand, in this coagulation chamber, warm water, held at 45° C., was let flow down on the inner wall surface as a recovering liquid through side spray nozzles mounted at the top of its inner wall and inside this chamber, 10% aqueous solution of hydrochloric acid held at 15° C. was dispersed into less than 100 micron fine liquid droplets by injecting steam at 0.6 kg/cm² through an internal mixing type 1 fluid nozzle with a 2.0mm bore thereby forming, in the interior of this chamber, a coagulating atmosphere held at a temperature of 42°-45° C. and a pressure equal to the atmospheric pressure.

The latex liquid droplets thus dispersed were coagulated as they made contact with the coagulant, while falling inside the coagulating chamber, to be collected by the recovering liquid, and then, taken out of the coagulation chamber as a slurry. The coagulated particles of the latex in the slurry taken out of the coagulating chamber were nearly perfectly spherical independent particles which had barely undergone breakdown or had scarcely merged. This slurry was heated to 60° C. under stirring and after holding it at this temperature for 10 minutes, coagulated particles were taken out by means of a centrifugal dehydrator using a filter cloth. The coagulated particles were in nearly perfect spherical shape with a mean particle diameter of 200 microns and a 53% solid content. The coagulated particles had 0.058 millimol/g solid content of carboxylic acid compounds, as carboxyl group, which was brought in by the potassium rhodinate and semi-hardened beef tallow fatty acid, being emulsifiers, and 8,900 ppm of residual styrene monomer.

Fifty grams of the hydrous coagulated particles were taken, put in a 150 ml of each of the under-mentioned organic liquids held at a constant temperature in a beaker, taken up by draining off liquid in a Nutche, after holding the particles for 30 minutes in the liquid, while gently stirring it; then, the amount of carboxyl group was determined by conductometric titration, and the amount of styrene by gas chromatography. It should be noted that this polymer's estimated SP value was 8.8±2, and its estimated critical interfacial tension was 34±2 dyne/cm.

TABLE 8

| Test | Liquid | Temperature (°C.) | Carboxyl group content (milimol/g) | Amount of styrene (ppm) |
|---|---|---|---|---|
| m | n-Hexane | 60 | 0.018 | 2810 |
| n | 2-Butanol | 40 | 0.022 | 2950 |
| o | n-Haxane | 30 | 0.020 | 3000 |
| p | n-Hexane/isopropanol 5:1 (ratio by volume) | 50 | 0.019 | 2970 |
| q | n-Pentane/ethanol = 80/20 (ratio by volume) | 30 | 0.020 | 2980 |

The results of Table 8 suggest that all the tests above-listed show large removal rates in view of the fact that the equilibrium concentration of carboxyl group and the amount of styrene in the extraction are respectively 0.0164 millimol/g and 2520 ppm, respectively.

In all tests above-listed, water was expelled from the particles within several minutes after their immersion in the organic liquid, and was accumulated at the bottom of the beaker, thus forming two phases. The particles were found existing at the bottom of the upper phase organic liquid. It should be noted that the stirring was so gentle that the water accumulating at the bottom was not dispersed into the liquid. This extraction operation permits the particles to maintain their spherical shape without undergoing breakdown or merger.

In the test m, residues inside the particles were examined in terms of the concentration of each element of K, C, S, P, Si, Mg and Na by way of fluorescent X-ray analysis. The results were as shown in Table 9, thus attesting to the fact that impurities had been nearly completed removed.

TABLE 9

| Name of element | Particles before subjected to extraction | Particles after subjected to extraction |
| --- | --- | --- |
| K | 50 | Undetected |
| Cl | 260 | Undetected |
| S | 660 | 300 |
| P | 10 | Undetected |
| Si | 30 | 20 |
| Mg | 90 | 10 |
| Na | 240 | Undetected |
| | | (Unit: ppm) |

COMPARATIVE EXAMPLE 7

Particles obtained by heating to 82° C., rather than to 60° C., a slurry produced by a similar operation as in Example 4 were subjected to similar tests with organic liquids as in Example 4.

In all tests, the reduction from their initial contents merely stayed at 15–20% for carboxyl group, and 20–25% for residual styrene monomer, and even when the extraction time was further prolonged by one or two hours, almost no further reduction occurred. Even when the particles were immersed in the liquid, a very small amount of the water which seemed to have been adhering onto the particle surfaces was merely observed this was evidence that the water inside the particles obviously had not been allowed to come out to be expelled. This phenomenon and the fact that the dryability of particles, after being subjected to extraction, was very low seems to suggest that the surface and the interiors of particles were fused together by raising the temperature to 82° C.

COMPARATIVE EXAMPLE 8

Particles obtained by a similar operation as in Example 4 were subjected to an extraction operation similarly as in Example 4 with the organic liquids and at the respective temperatures listed in Table 10. The results are shown in Table 10.

TABLE 10

| Test | Liquid | Temperature (°C.) | Carboxyl group content (milimol/g) | Amount of styrene (ppm) |
| --- | --- | --- | --- | --- |
| g | Methanol | 40 | 0.054 | 8050 |
| h | n-Propanol | 50 | 0.049 | 8200 |
| i | Benzene | 50 | 0.055 | 7900 |
| j | Acetone | 30 | 0.055 | 8150 |
| k | n-Hexanol | 60 | 0.047 | 7600 |
| l | n-Hexane/acetone 50:50 (ratio by volume) | 50 | 0.051 | 7800 |

In tests g and h, no fusion was observed in particles after being subjected to extraction. No separated phase of water was found at the bottom of the beaker. In tests i, j, k and l, the particles swelled into a softened and fused state. Particularly, in i and j, particles mutually unified and agglomerated in the beaker. In i, j, k and l, a very small amount of water seemed to have been expelled; a small amount of water was found accumulating at the bottom of the beaker.

The results of removal by extraction were confirmed to undergo almost no change, even if the time of extraction was prolonged to one hour.

As hereabove-described, in these tests, extraction was found to be performed at very low efficiencies; particularly in i, j, k and l, drying after dehydration was found very difficult and a phenomenon that the interiors of particles swell, the temperature rises, manifested itself.

EXAMPLE 5

Fifty grams of hydrous particles obtained by a similar method as in Example 3 were put in a 10 mesh wire net container; and as they were immersed in 50 ml of n-hexane added at 60° C. for 5 minutes, the water inside the particles was expelled and accumulated at the bottom of the container.

Then the particles were separated from the liquids and were immersed in 150 ml of ethanol at 60° C. for 30 minutes. When the particles were dehydrated and taken out, and the amount of carboxyl group contained in the particles was measured, it was found to have decreased to 0.030 millimol/g of the polymer solid content from 0.097 millimol/g.

Since the equilibrium concentration in extraction of carboxyl group was approximately 0.27 millimol/g, the removal may be said to have been nearly complete made.

What is claimed is:

1. A method for recovering polymer agglomerates, comprising the steps of:
   (A) coagulating a polymer latex obtained by emulsion polymerization or suspension polymerization to thereby form hydrous agglomerates in which latex particles are not fused together, heating the hydrous agglomerates at a temperature lower than the temperature at which the latex particles constituting the agglomerates are fused together, thereafter separating the hydrous agglomerates from an aqueous phase,
   (B) immersing the hydrous agglomerates in an organic liquid insoluble or hardly soluble in water which wets but does not dissolve or swell said agglomerates at a temperature lower than the temperature at which the latex particles constituting the agglomerates are fused together, to thereby substitute said organic liquid for the water contained in the agglomerates,
   (C) forming two phases; a water phase expelled from the agglomerates and an organic liquid phase in which the agglomerates are immersed,
   (D) separating the agglomerates from the organic liquid phase, and
   (E) removing by evaporation the organic liquid attached to the agglomerates, whereby the agglomerates are recovered as dry particles.

2. A method for recovering and purifying the polymer agglomerates, comprising the steps of:
   (A) coagulating a polymer latex obtained by emulsion polymerization or suspension polymerization to thereby form hydrous agglomerates in which latex particles are not fused together, heating the hydrous agglomerates at a temperature lower than the temperature at which the latex particles constituting the agglomerates fuse together, thereafter separating the hydrous agglomerates from an aqueous phase,
   (B) immersing the hydrous agglomerates in an organic liquid insoluble or hardly soluble in water which wets but does not dissolve or swell the agglomerates and which dissolves impurities at a temperature lower than the temperature at which said latex particles constituting the agglomerates are fused together, to thereby substitute said organic liquid for the water contained in the agglomerates, (C) forming two phases; a water phase expelled from the agglomerates and an organic liquid phase in which the agglomerates are immersed, (D) dissolving and extracting impurities contained in the agglomerates in the organic phase, (E) separating the agglomerates from the organic liquid phase, and (F) removing by evaporation the organic liquid attached to the agglomerates, whereby the agglomerates are recovered as dry particles.

3. The method according to claim 2, wherein the agglomerates, after being separated from the organic liquid phase in the step (E), are immersed in a second organic liquid, which does not dissolve or swell the agglomerates and which dissolves impurities, at a temperature lower than the temperature at which the latex particles constituting the agglomerates are fused together, to further dissolve and extract impurities contained in the agglomerates.

4. The method according to claim 1, 2 or 3, wherein the organic liquid is one having a surface tension not more than 30 dyne/cm.

5. The method according to claim 1, 2 or 3, wherein the organic liquid is at least one hydrocarbon with a carbon number of 4–7.

6. The method according to claim 1, 2 or 3, wherein the organic liquid is at least one alcohol with a carbon of 4–5.

7. The method according to claim 1, 2 or 3, wherein the organic liquid is a mixed solvent prepared by adding at least one alcohol having 1–5 carbon atoms to at least one hydrocarbon having 4–7 carbon atoms as its main component.

8. The method according to claim 3, wherein the second organic liquid is at least one alcohol having 1–5 carbon atoms.

9. The method according to claim 1 or 2, wherein the coagulant is an acid or an aqueous solution of an acid.

10. The method according to claim 1 or 2, wherein the coagulant is a salt and the agglomerates are immersed in an acid or an aqueous solution of an acid before the agglomerates and the organic liquid are brought into contact with each other.

11. The method according to claim 2 or 3, wherein the impurities are mainly emulsifiers.

12. The method according to claim 2 or 3, wherein the impurities are mainly sodium or potassium salts of fatty acids.

13. The method according to claim 1 or 2, wherein the polymer latex is obtained by polymerizing monomers comprising 20–80 parts of acrylonitrile monomer, 20–80 parts of one member or a mixture of two or more members of vinyl chloride, vinylidene chloride, vinyl bromide and vinylidene bromide, and 0–10 parts of easily dyable monomer.

14. The method according to claim 1 or 2, wherein the polymer latex is a butadienic polymer latex consisting of 0–50% by weight of styrene and 50–100% by weight of butadiene.

15. The method according to claim 1 or 2, wherein the polymer latex is obtained by polymerizing 20–80 parts of monomers comprising 0–50% by weight of acrylates, 0–100% by weight of methacrylates, 0–90% by weight of vinyl aromatics, 0–90% by weight of vinyl cyanides and 0–20% by weight of other copolymerizable monomers in the presence of 20–80 parts of butadienic polymer latices.

16. The method according to claim 1 or 2, wherein the polymer latex is obtained by polymerizing 80–100 parts of monomers comprising 10–100% by weight of methyl methacrylate, 0–60% by weight of methacrylates exclusive of methyl methacrylate or acrylates, 0–90% by weight of vinyl aromatics and 0–90% by weight of vinyl cyanides in the presence of 0–20% by weight parts of rubbery polymer latices consisting of 0–50% by weight of styrene, 50–100% by weight of butadiene, and 50–100 parts of polymer (B) formed by polymerizing monomers comprising 0–70 mol % of α methyl styrene and 30–100 mol % of at least one monomer selected from among vinyl aromatics, methacrylates, acrylates, acrylic acid and vinyl cyanides.

17. The method according to claim 1 or 2, wherein the polymer latex is a mixed latex of 0–50 parts of graft copolymer (A) formed by polymerizing 10–90 parts of one or two or more members of monomers selected from among vinyl aromatics, methacrylates, acrylates and vinyl cyanides in the presence of 10–90 parts of butadienic polymers consisting of 0–50% of styrene and 50–100% of butadiene, and 50–100 parts of polymer (B) formed by polymerizing monomers comprising 0–70 mol % of α-methyl styrene and 30–100 mol % of one or two or more members of monomers selected from among vinyl aromatics, methacrylates, acrylates, acrylic acid and vinyl cyanides.

18. The method according to claim 1 or 2, wherein the polymer latex is obtained by polymerization 15–95 parts of at least one monomer selected from among methacrylates, vinyl cyanides, acrylates, vinyl aromatics and other monomers copolymerizable therewith, in the presence of 5–85 parts of rubber polymers obtained by polymerizing 40–100% by weight of acrylates and 0–60% by weight of monomer selected from among vinyl aromatics, vinyl cyanides, vinyl chloride, vinylidene chloride, vinyl acetate or conjugate diolefin, and 0–10% by weight of crosslinking agent.

19. The method according to claim 1 or 2, wherein the polymer latex is obtained by polymerizing 40–100 parts of vinylidene chloride and 0–60 parts of at least one monomer selected from among vinyl aromatics, vinyl cyanides, acrylates, methacrylates, acrylic acid, methacrylic acid, itaconic acid, maleic acid and crosslinking monomers.

20. The method according to claim 1 or 2, wherein the polymer latex is obtained by polymerizing 40–100 parts of vinyl chloride, 0–20 parts of vinyl cyanides and 0–60 parts of at least one monomer selected from among vinylidene chloride, vinyl bromide, vinylidene bromide, acrylates, methacrylates, acrylic acid, methacrylic acid, itaconic acid, maleic acid and crosslinking monomers.

* * * * *